(12) United States Patent
Lee et al.

(10) Patent No.: US 9,311,567 B2
(45) Date of Patent: Apr. 12, 2016

(54) MANIFOLD LEARNING AND MATTING

(76) Inventors: Kuang-chih Lee, Union City, CA (US);
Robinson Piramuthu, Oakland, CA (US)

( * ) Notice: Subject to any disclaimer, the term of this patent is extended or adjusted under 35 U.S.C. 154(b) by 0 days.

(21) Appl. No.: 13/068,460

(22) Filed: May 10, 2011

(65) Prior Publication Data
US 2011/0274344 A1 Nov. 10, 2011

Related U.S. Application Data

(60) Provisional application No. 61/395,078, filed on May 10, 2010.

(51) Int. Cl.
*G06K 9/62* (2006.01)
*G06T 7/00* (2006.01)

(52) U.S. Cl.
CPC ............ *G06K 9/6252* (2013.01); *G06T 7/0081* (2013.01); *G06T 7/0087* (2013.01); *G06T 2207/20144* (2013.01)

(58) Field of Classification Search
USPC ................................................ 382/173, 155
See application file for complete search history.

(56) References Cited

U.S. PATENT DOCUMENTS

| | | | |
|---|---|---|---|
| 5,757,380 A | 5/1998 | Bardon et al. | |
| 5,832,055 A | 11/1998 | Dewaele | |
| 5,881,171 A | 3/1999 | Kinjo | |
| 5,930,391 A | 7/1999 | Kinjo | |
| 6,021,221 A | 2/2000 | Takaha | |
| 6,205,260 B1 | 3/2001 | Crinon et al. | |
| 6,222,637 B1 | 4/2001 | Ito et al. | |
| 6,421,459 B1 | 7/2002 | Rowe | |
| 6,429,590 B2 | 8/2002 | Holzer | |
| 6,549,646 B1 | 4/2003 | Yeh et al. | |
| 6,650,778 B1 | 11/2003 | Matsugu et al. | |
| 6,687,397 B2 | 2/2004 | DeYong et al. | |
| 6,697,502 B2 | 2/2004 | Luo | |
| 6,757,442 B1 | 6/2004 | Avinash | |
| 6,834,127 B1 | 12/2004 | Yamamoto | |

(Continued)

FOREIGN PATENT DOCUMENTS

JP 2005339522 A 12/2005

OTHER PUBLICATIONS

Vezhnevets V. et al., "A Comparative Assessment of Pixel-Based Skin Detection Methods", Technical Report, Graphics and Media Laboratory, 2005.
Leinhart R. et al., "Empirical analysis of detection cascades of boosted classifiers for rapid object detection", MRL Technical Report, Intel Labs, May 2002.

(Continued)

*Primary Examiner* — Ishrat I Sherali

(57) ABSTRACT

Systems for manifold learning for matting are disclosed, with methods and processes for making and using the same. The embodiments disclosed herein provide a closed form solution for solving the matting problem by a manifold learning technique, Local Linear Embedding. The transition from foreground to background is characterized by color and texture variations, which should be captured in the alpha map. This intuition implies that neighborhood relationship in the feature space should be preserved in the alpha map. By applying Local Linear Embedding using the disclosed embodiments, the local image variations can be preserved in the embedded manifold, which is the resulting alpha map. Without any strong assumption, such as color line model, the disclosed embodiments can be easily extended to incorporate other features beyond RGB color features, such as gradient and texture information.

20 Claims, 12 Drawing Sheets

(56) References Cited

U.S. PATENT DOCUMENTS

| | | |
|---|---|---|
| 6,940,526 B2 | 9/2005 | Noda et al. |
| 6,965,693 B1 | 11/2005 | Kondo et al. |
| 7,162,082 B2 | 1/2007 | Edwards et al. |
| 7,315,639 B2 | 1/2008 | Kuhnigk |
| 7,352,900 B2 | 4/2008 | Yamaguchi et al. |
| 7,391,906 B2 | 6/2008 | Blake et al. |
| 7,436,981 B2 | 10/2008 | Pace |
| 7,502,527 B2 | 3/2009 | Momose et al. |
| 7,526,131 B2 | 4/2009 | Weber |
| 7,613,355 B2 | 11/2009 | Hirano |
| 7,676,081 B2 | 3/2010 | Blake et al. |
| 7,711,146 B2 | 5/2010 | Tu et al. |
| 7,738,725 B2 | 6/2010 | Raskar et al. |
| 7,822,272 B2 | 10/2010 | Lei |
| 7,995,841 B2 | 8/2011 | Lin et al. |
| 8,041,081 B2 | 10/2011 | Hu |
| 8,094,928 B2 | 1/2012 | Graepel et al. |
| 8,126,269 B2 | 2/2012 | Eggert et al. |
| 8,149,236 B2 | 4/2012 | Nakao et al. |
| 8,165,407 B1 | 4/2012 | Khosla et al. |
| 8,175,369 B2 | 5/2012 | Hong et al. |
| 8,194,974 B1 | 6/2012 | Skirko |
| 8,462,224 B2 | 6/2013 | Zhang et al. |
| 2002/0071131 A1 | 6/2002 | Nishida |
| 2002/0076100 A1 | 6/2002 | Luo |
| 2002/0154828 A1 | 10/2002 | Kobilansky et al. |
| 2002/0164074 A1 | 11/2002 | Matsugu et al. |
| 2003/0095701 A1 | 5/2003 | Shum et al. |
| 2003/0103682 A1 | 6/2003 | Blake et al. |
| 2003/0144585 A1 | 7/2003 | Kaufman et al. |
| 2004/0004626 A1 | 1/2004 | Ida et al. |
| 2004/0131236 A1 | 7/2004 | Chen et al. |
| 2004/0179233 A1 | 9/2004 | Vallomy |
| 2004/0212725 A1 | 10/2004 | Raskar |
| 2004/0264767 A1 | 12/2004 | Pettigrew |
| 2005/0008248 A1 | 1/2005 | Wang |
| 2005/0027896 A1 | 2/2005 | Mairs et al. |
| 2005/0196024 A1 | 9/2005 | Kuhnigk |
| 2005/0259280 A1 | 11/2005 | Rozzi |
| 2005/0271279 A1 | 12/2005 | Fujimora et al. |
| 2006/0029275 A1 | 2/2006 | Li et al. |
| 2006/0233448 A1 | 10/2006 | Pace et al. |
| 2006/0245007 A1 | 11/2006 | Izawa et al. |
| 2006/0251322 A1 | 11/2006 | Palum et al. |
| 2006/0269111 A1 | 11/2006 | Stoecker et al. |
| 2007/0013813 A1 | 1/2007 | Sun et al. |
| 2007/0247679 A1 | 10/2007 | Pettigrew et al. |
| 2007/0297645 A1 | 12/2007 | Pace et al. |
| 2008/0089609 A1 | 4/2008 | Perlmutter et al. |
| 2008/0123945 A1 | 5/2008 | Andrew et al. |
| 2008/0137979 A1 | 6/2008 | Perlmutter et al. |
| 2008/0292194 A1 | 11/2008 | Schmidt et al. |
| 2009/0010539 A1 | 1/2009 | Guarnera et al. |
| 2009/0060297 A1 | 3/2009 | Penn et al. |
| 2009/0087089 A1 | 4/2009 | Hu |
| 2009/0129675 A1 | 5/2009 | Eggert et al. |
| 2009/0190815 A1 | 7/2009 | Dam et al. |
| 2009/0251594 A1 | 10/2009 | Hua et al. |
| 2009/0315910 A1 | 12/2009 | Kambhamettu et al. |
| 2010/0061628 A1* | 3/2010 | Yamada ......................... 382/167 |
| 2010/0150423 A1 | 6/2010 | Hong et al. |
| 2010/0171740 A1 | 7/2010 | Andersen et al. |
| 2010/0232685 A1 | 9/2010 | Yokokawa et al. |
| 2010/0316288 A1 | 12/2010 | Ip et al. |
| 2011/0096228 A1 | 4/2011 | Deigmoeller et al. |

OTHER PUBLICATIONS

Wang et al. "Soft scissors: an interactive tool for real time high quality matting", ACM Transactions on Graphics, Proceedings of the SIGGRAPH Conference, vol. 26, issue 3, Jul. 2007.

Foley, Computer Graphics: Principles and Practice, Addison-Wesley Professional, p. 13, 1995).

Russ, Chapter 6—Segmentation and Thresholding, The Image Processing Handbook, 4th Ed., pp. 333-381, 2002.

Grady et al., Random Walks for Interactive AlphaMatting, Visualization, Imaging, and Image Processing: Fifth IASTED International Conference Proceedings, 2005.

Shi J. et al., Normalized Cuts and Image Segmentation, IEEE Trans. On Pattern Analysis and Machine Intelligence, vol. 22, No. 8, pp. 888-905, Aug. 2000.

Viola P. et al., Rapid object detection using a boosted cascade of simple features, Proceedings of Computer Vision and Pattern recognition, vol. 1, pp. 511-518, 2001.

Levin A. et al., A Closed-Form Solution to Natural Image Matting, IEEE Transactions on Pattern Analysis and Machine Intelligence (PAMI), vol. 30, No. 2, Feb. 2008.

Beyer W., Traveling matte photography and the blue screen system. American Cinematographer. The second of a fourpart series., 1964.

He K. et al., Single image haze removal using dark channel prior. Proc. IEEE Conf. on Comp. Vision and Patt. Recog., 2009.

Hsu E. et al., Light mixture estimation for spatially varying white balance. Proceedings of SIGGRAPH, 2008.

Levin A. et al., Spectral matting. IEEE Transactions on Pattern Analysis and Machine Intelligence, 30(10), 2008.

R. Fielding. The technique of special effects cinematography, third edition. Focal/Hastings House, pp. 220-243, 1972.

Rhemann C. et al., A perceptually motivated online benchmark for image matting. Proc. IEEE Conf. on Comp. Vision and Patt. Recog., 2009.

Roweis S. T. et al., Nonlinear dimensionality reduction by locally linear embedding. Science, 290(5500), 2000.

Singaraju D. et al., New appearance models for natural image matting. Proc. IEEE Conf. on Comp. Vision and Patt. Recog., 2009.

Sun J. et al., Flash matting. Proceedings of SIGGRAPH, 25(3): pp. 772-778, 2006.

Sun J. et al., Poisson matting. Proceedings of SIGGRAPH, 23(3): pp. 315-321, 2004.

Tenebaum J. et al., A global geometric framework for nonlinear dimensionality reduction. Science, 290(5500): pp. 2319-2323, 2000.

Wang J. et al., Optimized color sampling for robust matting. Proc. IEEE Conf. on Comp. Vision and Patt. Recog., 2007.

Zheng Y. et al., Learning based matting. Int. Conf. on Computer Vision, 2009.

Pachghare, Comprehensive Computer Graphics: Including C++, Laxmi Publications, p. 93, 2005.

Bin Abdul Rahman, KC Wei, RGB-H-CbCr Skin-Colour-Model—for—Human Face Detection, 2006.

Brand J. et al., A Comparative Assessment of Three Approaches to Pixel-level skin-detection, 2000.

Koschan A. et al., Digital Color Image Processing, ISBN 978-0-470-14708-5, 2007.

Lipowezky et al: "Using integrated color and texture features for automatic hair detection", IEEE, 2008.

Boykov et al., Graph Cuts and Efficient N-D Image Segmentation, International Journal of Computer Vision 70(2), 109-131,2006.

Chuang et al., A Bayesian Approach to Digital Matting, Proc. of IEEE CVPR, pp. 264-271, 2001.

* cited by examiner

MANIFOLD LEARNING AND MATTING

CROSS REFERENCE TO RELATED APPLICATION

This application claims priority to U.S. provisional patent Application No. 61/395,078, filed May 10, 2010, which is hereby incorporated by reference herein in its entirety.

BACKGROUND OF THE INVENTION

Matting technique originated in the film industry as early as late nineteenth century to replace the background in which the subject is located. The traditional approach in the film industry captured the subject directly against a single uniformly illuminated and uniformly colored background [See section titled "REFERENCES" R1,R2], and then replaced the background during the post processing. However, those steps required special hardware set up and the subject is restricted to be captured only in a controlled environment. Therefore, digital matting, a process of extracting and compositing the foreground and background objects directly from media, becomes significant technology for general image/film editing and production.

In digital matting, a matte is represented by the variable a that defines opacity of subject/foreground at each pixel. The observed image is represented as a convex combination of foreground and background layers. Most of the matting processes restrict a to be in the interval [0,1], for each pixel. The matting equation can be written as $$I = \alpha F + (1-\alpha)B, \quad \text{Equation (1)}$$

where I is the observed image, F and B are foreground and background colors respectively. This compositional model is the well-known matting equation. However, this matting equation is severely under-constrained. For a single channel image, one must estimate three unknown values $\alpha$, F, B at each pixel where only one value I is known. Setting constraint on alpha values of certain pixels simplifies the problem. The constrained matting problem can be viewed as supervised image segmentation where certain $\alpha$ values are known. Training/ground truth of $\alpha$ values are represented using a trimap or a set of scribbles. Trimap, as the name indicates, specifies foreground and background pixels in addition to unknown pixels for which $\alpha$, F, B need to be estimated. Scribbles are a sparse representation of trimap, where the user provides samples of foreground and background pixels in the form of scribbles, using a brush of fixed width. Even though trimaps are harder to produce manually than scribbles, trimaps can be produced automatically using initial bounding box by object detection processes, such as [See section titled "REFERENCES" R3].

There are various approaches for digital matting. Poisson matting [See section titled "REFERENCES" R7] assumes that the foreground and background colors are locally smooth. Gradient of matte is locally proportional to the gradient of the image. Matte is estimated by solving Poisson equation with Dirichlet boundary conditions extracted from the trimap. Random walk matting [See section titled "REFERENCES" R8] defines affinity between neighboring pixels as a Gaussian of the norm of distance in color space. Neighboring pixels with similar colors have higher affinities than those with dissimilar colors. Matte for a pixel can be viewed as the probability that a random walker from this pixel will reach a foreground pixel without passing through a background pixel. Closed-form weights [See section titled "REFERENCES" R4, R5] assume a color line model, where local foreground colors lie on a straight line, and background colors also form a line but not necessarily the same line for foreground in RGB space. Under this assumption, the matte is shown to be a linear combination of color components of neighboring pixels. Unlike random walk matting, the affinities depend on mean and variance of local color channels. Robust matting [See section titled "REFERENCES" R9] improves robustness of the process to trimap by sampling only a few representative foreground and background pixels.

Rhemann et al. [See section titled "REFERENCES" R10] shows that Levin et al.'s Closed Form Matting approach [See section titled "REFERENCES" R4, R5] outperforms other processes in most cases. Therefore, the closed-form formula [See section titled "REFERENCES" R4, R5] was commonly extended to other applications where a compositional model was applicable as well. For example, Hsu et al. [See section titled "REFERENCES" R11] formulates white balance as a matting problem in chromaticity space. Relative contributions of two light sources are estimated at each pixel using the matting Laplacian. This is later used to neutralize and relight the scene by controlling the light contribution from each source. Haze removal approach in [See section titled "REFERENCES" R12] estimates the medium transmission map using matting model. The transmission map is an exponential function of scene depth and hence depth map can also be derived. Despite its wide usage, Levin et al.'s approach [See section titled "REFERENCES" R4] assumes a simple color line model. However, natural images do not always satisfy the color line model. Singaraju et al. [See section titled "REFERENCES" R13] has analyzed the severity of ill-posedness for different scenarios of the color line model, and presented a new point-color model to fix those limitations. As should be apparent, am unfulfilled need exists for embodiments that do not rely on such a strong assumption, and can be easily extended to incorporate multiple features in addition to color, and therefore yields more accurate matting results.

REFERENCES

All references listed below are hereby incorporated by reference in their entirety herein.

[R1] W. Beyer. Traveling matte photography and the blue screen system. American Cinematographer. The second of a fourpart series, 1964.

[R2] R. Fielding. The technique of special effects cinematography, third edition. Focal/Hastings House, pages 220-243, 1972.

[R3] P. Viola and M. Jones. Robust real-time object detection. Int. J. Computer Vision, 1997.

[R4] A. Levin, D. Lischinski, and Y. Weiss. A closed form solution to natural image matting. IEEE Transactions on Pattern Analysis and Machine Intelligence, 30(2), 2008.

[R5] A. Levin, A. Rav-Acha, and D. Lischinski. Spectral matting. IEEE Transactions on Pattern Analysis and Machine Intelligence, 30(10), 2008.

[R6] J. Sun, J. Jia, C.-K. Tang, and H.-Y. Shum. Flash matting. Proceedings of SIGGRAPH, 25(3):772-778, 2006.

[R7] J. Sun, J. Jia, C.-K. Tang, and H.-Y. Shum. Poisson matting. Proceedings of SIGGRAPH, 23(3):315-321, 2004.

[R8] L. Grady. Random walks for image segmentation. IEEE Transactions on Pattern Analysis and Machine Intelligence, 28(11):1768-1783, 2006.

[R9] J. Wang and M. F. Cohen. Optimized color sampling for robust matting. Proc. IEEE Conf. on Comp. Vision and Patt. Recog., 2007.

[R10] C. Rhemann, C. Rother, J. Wang, M. Gelautz, P. Kohli, and P. Rott. A perceptually motivated online benchmark for image matting. Proc. IEEE Conf. on Comp. Vision and Patt. Recog., 2009.

[R11] E. Hsu, T. Mertens, S. Paris, S. Avidan, and F. Durand. Light mixture estimation for spatially varying white balance. Proceedings of SIGGRAPH, 2008.

[R12] K. He, J. Su, and X. Tang. Single image haze removal using dark channel prior. Proc. IEEE Conf. on Comp. Vision and Patt. Recog., 2009.

[R13] D. Singaraju, C. Rother, and C. Rhemann. New appearance models for natural image matting. Proc. IEEE Conf. on Comp. Vision and Patt. Recog., 2009.

[R14] S. T. Roweis and L. K. Saul. Nonlinear dimensionality reduction by locally linear embedding. Science, 290(5500), 2000.

[R15] Y. Zheng and C. Kambhamettu. Learning based matting. Int. Conf. on Computer Vision, 2009.

[R16] J. Shi and J. Malik. Normalized cuts and image segmentation. IEEE Transactions on Pattern Analysis and Machine Intelligence, pages 731-737, 1997.

[R17] J. Tenebaum, V. de Silva, and J. Langford. A global geometric framework for nonlinear dimensionality reduction. Science, 290(5500):2319-2323, 2000.

SUMMARY

The following presents a simplified summary of the disclosure in order to provide a basic understanding to the reader. This summary is not an extensive overview of the disclosure and it does not identify key or critical elements of the embodiments disclosed nor delineate the scope of the disclosed embodiments. Its sole purpose is to present some concepts disclosed herein in a simplified form as a prelude to the more detailed description that is presented later.

Systems for manifold learning for matting are disclosed, with methods and processes for making and using the same. The embodiments disclosed herein provide a closed form solution for solving the matting problem by a manifold learning technique, Local Linear Embedding. The transition from foreground to background is characterized by color and texture variations, which should be captured in the alpha map. This intuition implies that neighborhood relationship in the feature space should be preserved in the alpha map. By applying Local Linear Embedding using the disclosed embodiments, the local image variations can be preserved in the embedded manifold, which is the resulting alpha map. Without any strong assumption, such as color line model, the disclosed embodiments can be easily extended to incorporate other features beyond RGB color features, such as gradient and texture information.

BRIEF DESCRIPTION OF DRAWINGS

The accompanying drawings, which are included as part of the present specification, illustrate the presently preferred embodiments and together with the general description given above and the detailed description of the preferred embodiments given below serve to explain and teach the principles of the disclosed embodiments.

Figure 1:
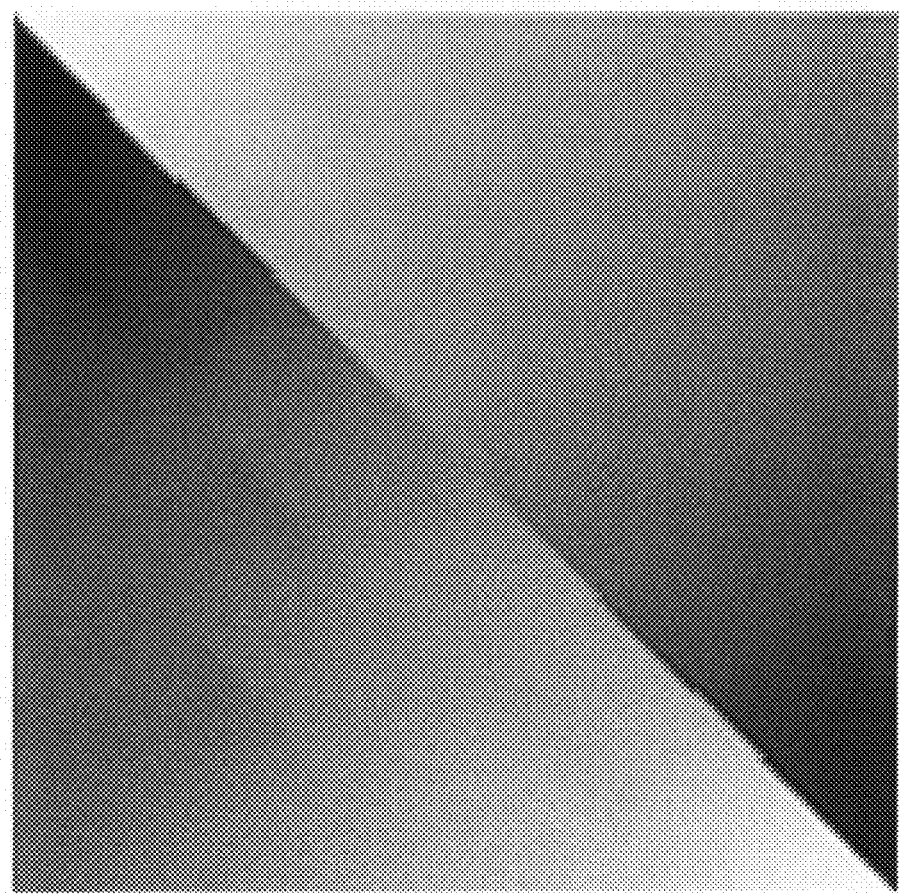
FIG. 1 is a sample image of a square formed by two triangles with different illumination ramps on top of the square, provided to illustrate the processes of the disclosed embodiments.

It should be noted that the figures are not drawn to scale and that elements of similar structures or functions are generally represented by like reference numerals for illustrative purposes throughout the figures. It also should be noted that the figures are only intended to facilitate the description of the preferred embodiments of the present disclosure. The figures do not illustrate every aspect of the disclosed embodiments and do not limit the scope of the disclosure.

DETAILED DESCRIPTION

Systems for manifold learning for matting are disclosed, with methods and processes for making and using the same.

In the following description, for purposes of explanation, specific nomenclature is set forth to provide a thorough understanding of the various inventive concepts disclosed herein. However it will be apparent to one skilled in the art that these specific details are not required in order to practice the various inventive concepts disclosed herein.

Some portions of the detailed description that follow are presented in terms of processes and symbolic representations of operations on data bits within a computer memory. These process descriptions and representations are the means used by those skilled in the data processing arts to most effectively convey the substance of their work to others skilled in the art. A process is here, and generally, conceived to be a self-consistent sequence of sub-processes leading to a desired result. These sub-processes are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "locating" or "finding" or the like, may refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission, or display devices.

The disclosed embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk, including floppy disks, optical disks, CD-ROMS, and magnetic-optical disks, read-only memories ("ROMs"), random access memories ("RAMs"), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct more specialized apparatus to perform the required method sub-processes. The required structure for a variety of these systems will appear from the description below. In addition, the disclosed embodiments are not described with reference to any particular programming language. It will be appreciated that a variety of programming languages may be used to implement the teachings of the disclosed embodiments.

In some embodiments an image is a bitmapped or pixmapped image. As used herein, a bitmap or pixmap is a type of memory organization or image file format used to store digital images. A bitmap is a map of bits, a spatially mapped array of bits. Bitmaps and pixmaps refer to the similar concept of a spatially mapped array of pixels. Raster images in general may be referred to as bitmaps or pixmaps. In some embodiments, the term bitmap implies one bit per pixel, while a pixmap is used for images with multiple bits per pixel. One example of a bitmap is a specific format used in Windows that is usually named with the file extension of .BMP (or .DIB for device-independent bitmap). Besides BMP, other file formats that store literal bitmaps include InterLeaved Bitmap (ILBM), Portable Bitmap (PBM), X Bitmap (XBM), and Wireless Application Protocol Bitmap (WBMP). In addition to such uncompressed formats, as used herein, the term bitmap and pixmap refers to compressed formats. Examples of such bitmap formats include, but are not limited to, formats, such as JPEG, TIFF, PNG, and GIF, to name just a few, in which the bitmap image (as opposed to vector images) is stored in a compressed format. JPEG is usually lossy compression. TIFF is usually either uncompressed, or losslessly Lempel-Ziv-Welch compressed like GIF. PNG uses deflate lossless compression, another Lempel-Ziv variant. More disclosure on bitmap images is found in Foley, 1995, Computer Graphics Principles and Practice, Addison-Wesley Professional, p. 13, ISBN 0201848406 as well as Pachghare, 2005, Comprehensive Computer Graphics: Including C++, Laxmi Publications, p. 93, ISBN 8170081858, each of which is hereby incorporated by reference herein in its entirety.

In typical uncompressed bitmaps, image pixels are generally stored with a color depth of 1, 4, 8, 16, 24, 32, 48, or 64 bits per pixel. Pixels of 8 bits and fewer can represent either grayscale or indexed color. An alpha channel, for transparency, may be stored in a separate bitmap, where it is similar to a greyscale bitmap, or in a fourth channel that, for example, converts 24-bit images to 32 bits per pixel. The bits representing the bitmap pixels may be packed or unpacked (spaced out to byte or word boundaries), depending on the format. Depending on the color depth, a pixel in the picture will occupy at least n/8 bytes, where n is the bit depth since 1 byte equals 8 bits. For an uncompressed, packed within rows, bitmap, such as is stored in Microsoft DIB or BMP file format, or in uncompressed TIFF format, the approximate size for a n-bit-per-pixel (2n colors) bitmap, in bytes, can be calculated as: size width×height×n/8, where height and width are given in pixels. In this formula, header size and color palette size, if any, are not included. Due to effects of row padding to align each row start to a storage unit boundary such as a word, additional bytes may be needed.

In computer vision, segmentation refers to the process of partitioning a digital image into multiple regions (sets of pixels). The goal of segmentation is to simplify and/or change the representation of an image into something that is more meaningful and easier to analyze. Image segmentation is typically used to locate objects and boundaries (lines, curves, etc.) in images.

The result of image segmentation is a set of regions that collectively cover the entire image, or a set of contours extracted from the image. Each of the pixels in a region share a similar characteristic or computed property, such as color, intensity, or texture. Adjacent regions are significantly different with respect to the same characteristic(s).

Several general-purpose algorithms and techniques have been developed for image segmentation. Exemplary segmentation techniques are disclosed in *The Image Processing Handbook*, Fourth Edition, 2002, CRC Press LLC, Boca Raton, Fla., Chapter 6, which is hereby incorporated by reference herein for such purpose. Since there is no general solution to the image segmentation problem, these techniques often have to be combined with domain knowledge in order to effectively solve an image segmentation problem for a problem domain.

Throughout the present description of the disclosed embodiments described herein, all steps or tasks will be described using this one or more embodiment. However, it will be apparent to one skilled in the art, that the order of the steps described could change in certain areas, and that the embodiments are used for illustrative purposes and for the purpose of providing understanding of the inventive properties of the disclosed embodiments.

The embodiments disclosed herein provide a closed form solution for solving the matting problem by a manifold learning technique, Local Linear Embedding (LLE) [See section titled "REFERENCES" R14]. The main idea of applying LLE concept in matting problem is the transition from foreground to background is characterized by color and texture variations, which should be captured in the alpha map. This intuition implies that neighborhood relationship in the feature space should be preserved in the alpha map. By applying LLE using the disclosed embodiments, the local image variations can be preserved in the embedded manifold, which is the resulting alpha map. Without any strong assumption, such as color line model [See section titled "REFERENCES" R4, R5], the disclosed embodiments can be easily extended to incorporate other features beyond RGB color features, such as gradient and texture information.

A closed-form solution may be derived for the alpha matting problem by manifold learning. The assumption is that all the features of foreground and background layers extracted from an input image I with n pixels are locally smooth, and thereby can be inherently embedded in some smooth manifold. The solution $\alpha_i$ for each image pixel $I_i$ is the one dimensional embedding approximating the inherent foreground and background manifolds. Let $f_i = [f_{i1}, \ldots f_{im}]^T$ be the feature vector associated with each image pixel i, where m equals the number of features. Define matrix $F = [f_1, \ldots, f_n]$ and vector $\alpha = [\alpha_1, \ldots, \alpha_n]^T$. Assuming that the inherent manifolds of foreground and background layers are well-sampled, we can expect that the feature vector $f_i$ of each image pixel and its neighbors lie closely on a locally linear patch of the inherent manifold. Consider an embedding $\mathbb{R}^{m \times n} \to \mathbb{R}^n$ that takes a smooth manifold F to $\alpha$. One goal is to find a closed form solution of this nonlinear inherent embedding.

By introducing the approach of Local Linear Embedding (LLE) [See section titled "REFERENCES" R14], we can characterize the local geometry of the each feature vector $f_i$ by a set of linear coefficients reconstructing the feature vector itself from its neighbors. Denote $w_i = [w_{i1} \ldots, W_{im}]^T$ where $w_{ij}$ represents the reconstruction weight of neighboring pixel j to pixel i, i.e., $\hat{f}_i = \Sigma_j w_{ij} f_j = F w_i$. Define $w_{ij} = 0$ when pixel j is not in the neighborhood of pixel i. Consider the reconstruction error $\epsilon_i$ for each individual feature $f_i$ as a vector in the following form:

$$\epsilon_i = \hat{f}_i - f_i = Fw_i - f_i \qquad \text{Equation (2)}$$

Under the constraint $\Sigma_j w_{ij} = 1^T w_i = 1$, we can rewrite this equation as $$\epsilon_i = Fw_i - f_i(1^T w_i) = (F - f_i 1^T) w_i \qquad \text{Equation (3)}$$

Then the cost function of the reconstruction error for each pixel i can be written as:

$$\|\epsilon_i\|^2 = \epsilon_i^T \epsilon_i = w_i^T C_i w_i \qquad \text{Equation (4)}$$

where $C_i = (F - 1F_i^T)(F - 1F_i^T)^T$ defines the local covariance of $f_i$.

The solution of each $w_i$ can be calculated by minimizing the reconstruction error of Equation 3 in the following closed form [See section titled "REFERENCES" R14]:

$$w_i = \frac{c_i^{-1} 1}{1 c_i^{-1} 1} \qquad \text{Equation (5)}$$

$w_i$ can be also computed in a more efficient way by solving the linear system, $C_i w_i = 1$, and then normalize the weights $w_i$ to sum to one.

It can be shown that the embedding vectors a can be determined by minimizing the summation of the cost function Equation 4 over all $\alpha_i$ with solved $W = [w_1, \ldots, w_n]$ and the constraint $1^T w_i = 1$ in the following:

$$\alpha = \underset{\alpha}{\text{argmin}} \sum_i (\alpha^T w_i - \alpha_i)^T (\alpha^T w_i - \alpha_i) \qquad \text{Equation (6)}$$

$$= \underset{\alpha}{\text{argmin}} ((I_{(n)} - W^T)\alpha)^T ((I_{(n)} - W^T)\alpha)$$

$$= \underset{\alpha}{\text{argmin}} \alpha^T (I_{(n)} - W)(I_{(n)} - W)^T \alpha$$

where $I_{(n)}$ represents $n \times n$ identity matrix.

Note that Equation 6 is equivalent to the quadratic cost function of matting Laplacian commonly used in many previous approaches [See section titled "REFERENCES" R4, R5, R8, R15]. Since $(I_{(n)} - W)(I_{(n)} - W)^T$ is also a sparse symmetric matrix, we can define a new matting Laplacian matrix by assigning $L = (I_{(n)} - W)(I_{(n)} - W)^T$. There are two ways to solve Equation 6. The first approach presented by Grady [See section titled "REFERENCES" R8] partitions $\alpha$ into two disjoint sets, $\alpha_k$ and $\alpha_u$, where k and u represents the index of known and unknown pixels from user input, such as trimap or scribbles. Also L can be re-written as $$L = \begin{bmatrix} L_k & B \\ B & L_u \end{bmatrix}.$$

Then the global minimum can be found by taking the first derivative of Equation 6 with respect to $\alpha_u$ and setting it to zero. This step yields to solve the following sparse linear system:

$$L_u \alpha_u = -B^T \alpha_k \qquad \text{Equation (7)}$$

The second approach [See section titled "REFERENCES" R4, R15] explicitly includes the constraint of user input by adding a regularization term in the cost function:

$$\alpha = \underset{\alpha}{\text{argmin}} \alpha^T (I_{(n)} - W)(I_{(n)} - W)^T \alpha + (\alpha - \alpha^*)^T D(\alpha - \alpha^*), \qquad \text{Equation (8)}$$

where D is the diagonal matrix, and those diagonal elements are some constant value d for constrained pixels and zeros for all the others. $\alpha^*$ contains the alpha values specified by trimap or scribbles and zeros for all other pixels. The global minimum can be found again by taking the first derivative of Equation 8 with respect to all $\alpha$ and setting it to zero. This step yields to solve a larger sparse linear system in the following:

$$\alpha = ((I_{(n)} - W)(I_{(n)} - W)^T + D)^{-1} D\alpha^*. \qquad \text{Equation (9)}$$

An advantage of the first approach is that only small portion of L needs to be computed and the size of the linear system to be solved is smaller. However, the second approach utilizes the full Laplacian matrix and might yield more accurate matting results.

The following addresses the differences between our proposed closed form solution and others in previous work [See section titled "REFERENCES" R8, R4, R5, R15]. The main differences among those approaches are how to construct the Laplacian matrix. Random Walk [See section titled "REFERENCES" R8] and Normalized Cuts [See section titled "REFERENCES" R16] applied the Gaussian weights to construct the affinity matrix by:

$$\tilde{w}_{ij} = e^{-\|I_i - I_j\|^2 / \alpha^2} \qquad \text{Equation (10)}$$

and then the matting Laplacian matrix is defined by $L = D - \tilde{W}$, where D is a diagonal matrix and $d_{ii} = \Sigma_j \tilde{w}_{ij}$. The major problem of this affinity is that d is a global constant, which does not depend on local variance of each image, and therefore needs to be handpicked carefully for different images in order to generate qualified results.

Levin et al.'s approaches [See section titled "REFERENCES" R4, R5] assume that for each small patch in input image, the foreground and background layers lie on lines in RGB color space. There are some shortcomings of this strong assumption. First, natural images do not always satisfy the color line model. Second, it is not clear whether extending the line model to other image features, such as gradient or texture features, will work. Learning based matting [See section titled "REFERENCES" R15] performs a semi-supervised learning based approach to construct a different Laplacian matrix. However, this approach still assumes that the linear relationship between α and RGB color for each pixel. Therefore, the learning based matting cannot generalize well when the input image does not satisfy the assumption.

The disclosed embodiments do not assume any linear relationship between α and RGB color for each pixel. α is simply the embedding results of manifold learning from the feature space. Therefore, the disclosed embodiments do not suffer from the situation when an input image violates the assumption of linearity. In addition, the disclosed embodiments can be easily extended to incorporate multiple features, such as gradient and texture information, and therefore yields more accurate matting results. The following shows the comparisons on synthetic data in order to illustrate the aforementioned aspects of those well-known approaches. Levin et al.'s approach [See section titled "REFERENCES" R4] may be referred to as Closed Form Matting, and the disclosed embodiments may be referred to as Manifold Learning Matting (MLM).

Figure 2:
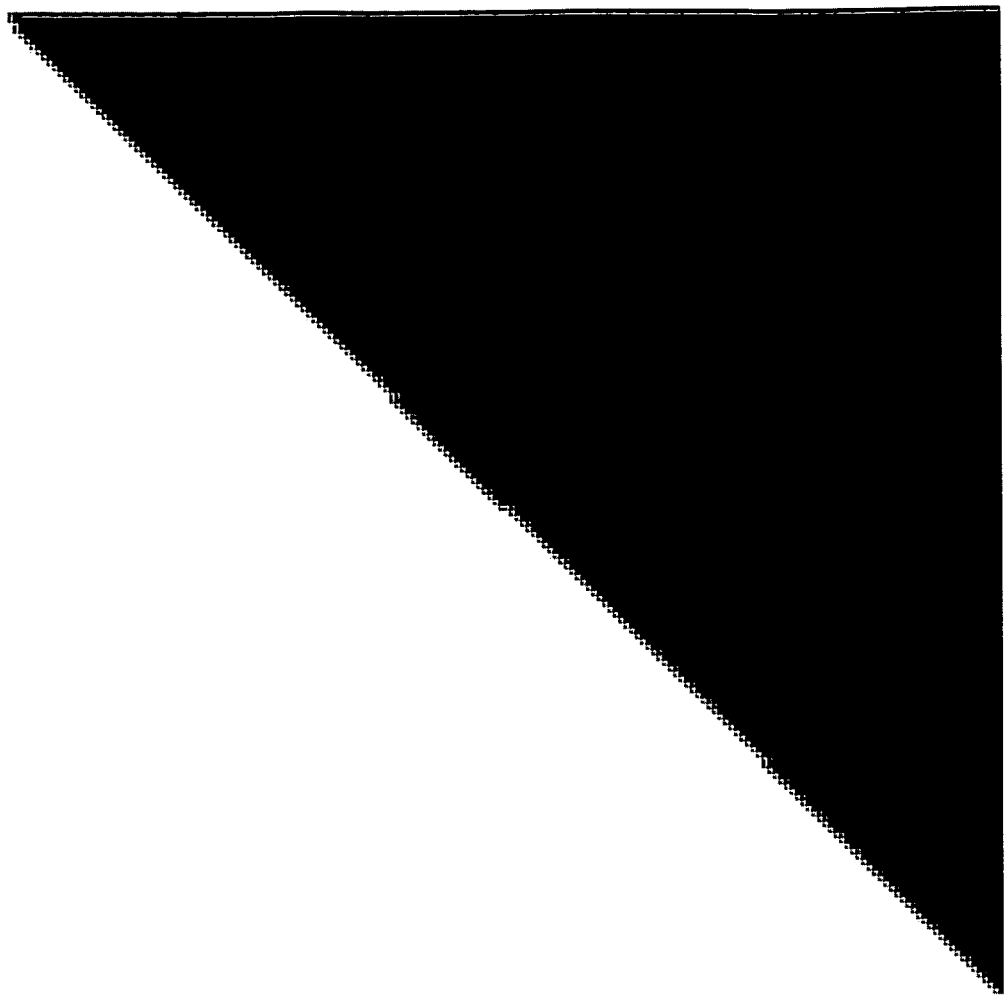
FIG. 2 illustrates the ground truth of the target mask for the image in FIG. 1.
Figure 3:
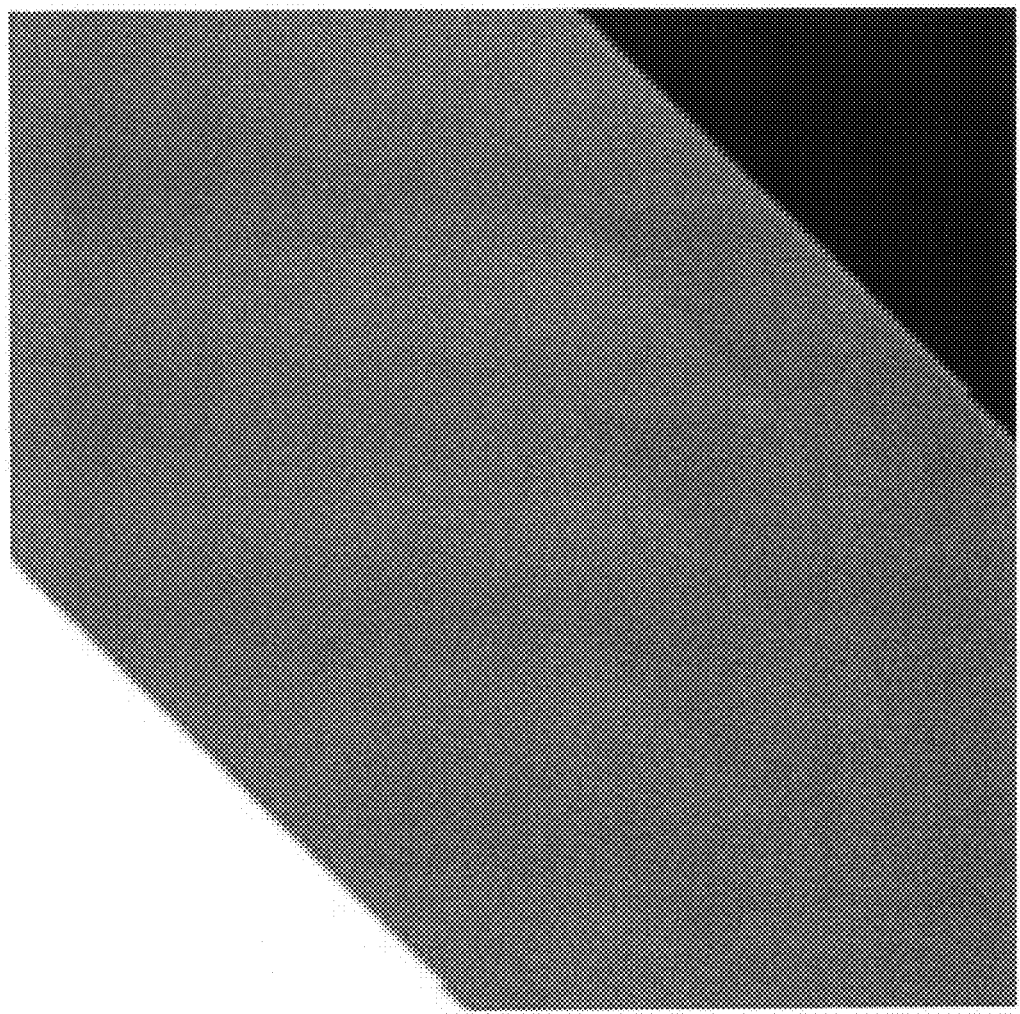
FIG. 3 illustrates the a defined trimap for the image in FIG. 1.
Figure 4:
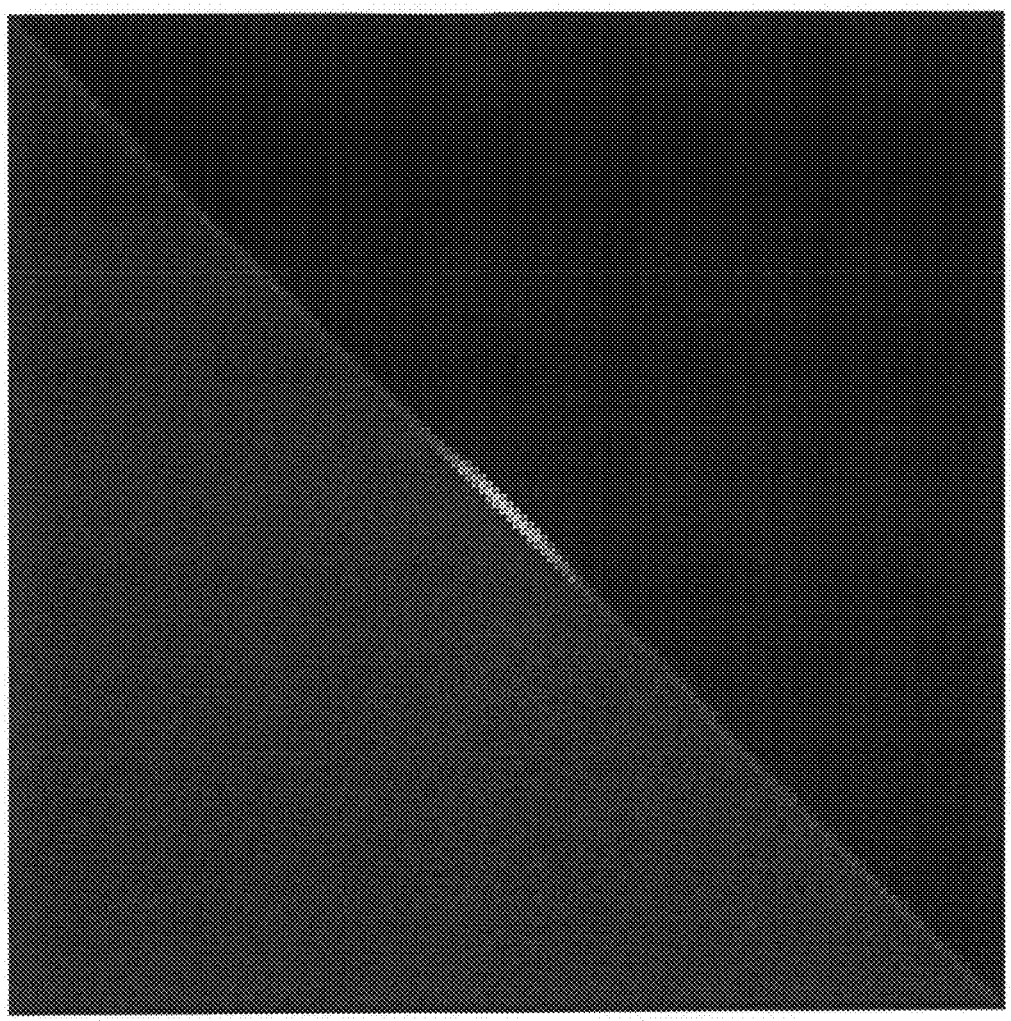
FIG. 4 displays the matting results of and Manifold Learning Matting with color and gradient features in gray scale for the image in FIG. 1.

FIG. 1 is a sample image of a square formed by two triangles with different illumination ramps on top of the square, provided to illustrate the processes of the disclosed embodiments. FIG. 2 illustrates the ground truth of the target mask for the image in FIG. 1. FIG. 3 illustrates the α defined trimap for the image in FIG. 1. The trimap illustrated is controlled by two parameters, $\gamma_F$ and $\gamma_B$, which denote the constant width of unknown region from the diagonal boundary into the foreground and background regions respectively. The goal is to find a matte that separates the two triangles. Due to the different direction of illumination ramps on the triangles, the contrast of the diagonal boundary is high on the corner, and low around the center of the image. FIG. 4 displays the matting results of and Manifold Learning Matting with color and gradient features in gray scale for the image in FIG. 1. These results were plotted using color map 'jet' in Matlab, and the range of pixel intensity is [0,1].

Note that bleeding is isotropic for Random Walk and MLM using only RGB color features. Closed Form Matting results in anisotropic bleeding biased along the off-diagonal. Bleeding is the least and anisotropically localized along the main diagonal for MLM using RGB and gradient of luminance as features.

Figure 5:
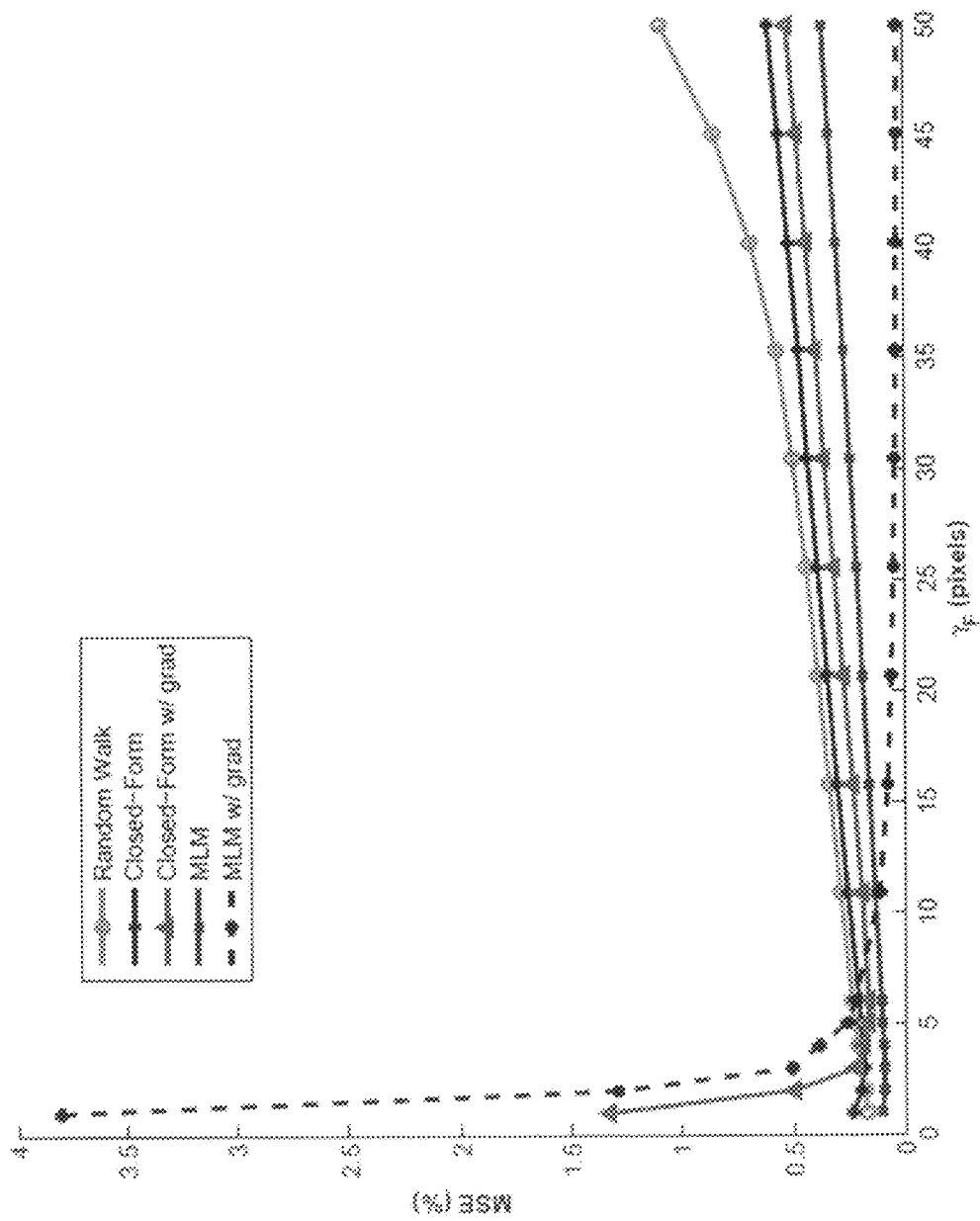
FIG. 5 is a chart utilized to illustrate the percentage of mean squared error for various values of $\gamma_F$, when $\gamma_F=\gamma_B$.

FIG. 5 is a chart utilized to illustrate the percentage of mean squared error for various values of $\gamma_F$, when $\gamma_F = \gamma_B$. The mean squared error (MSE) is normalized by the number of pixels in the unknown region of trimap. Observe that MLM produces results with the least MSE for most cases. Gradient of luminance stabilizes MLM more than Closed Form even for larger values of $\gamma_F$. For this test image, the gradient of luminance by itself can be used to cluster the pixels into foreground and background as desired. In other words, classifying pixels in this image does not need any trimap since necessary information is captured by the gradient of luminance. This information is more effectively used by MLM than Closed Form Matting. Even without use of gradient, MLM captures the shape of manifold better.

Figure 6:
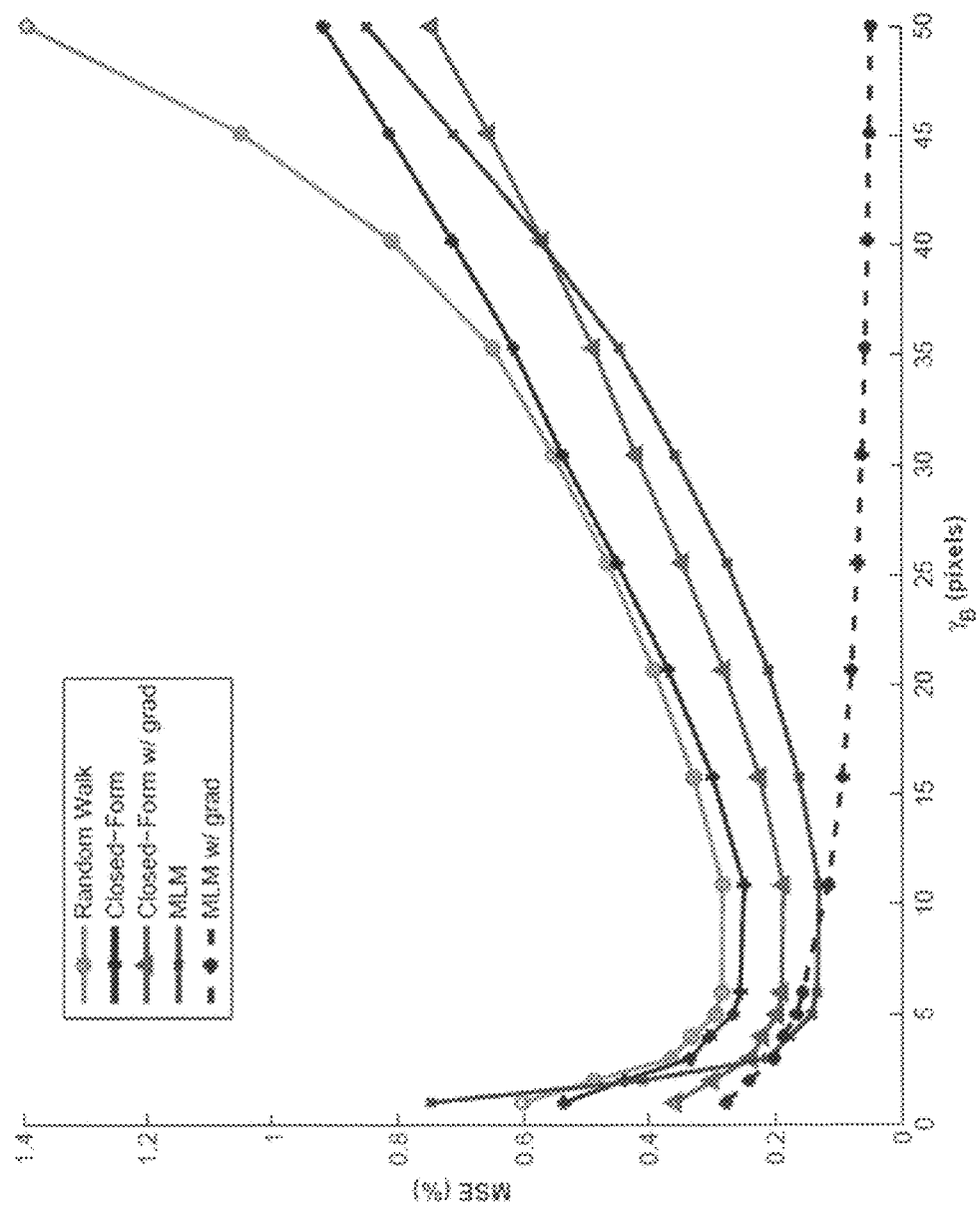
FIG. 6 is a chart utilized to illustrate the percentage of MSE when $\gamma_B=10$ pixels and $\gamma_F$ is varied.

To analyze proximity bias, fix $\gamma_B = 10$ pixels and vary $\gamma_F$. FIG. 6 is a chart utilized to illustrate the percentage of MSE when $\gamma_B = 10$ pixels and $\gamma_F$ is varied. Note that MLM with color and gradient features is least affected by proximity bias. Random Walk has the worst proximity bias. Again, MLM has less proximity bias than Closed Form for most values of $\gamma_F$, even when only RGB values are used as features.

Figure 7:
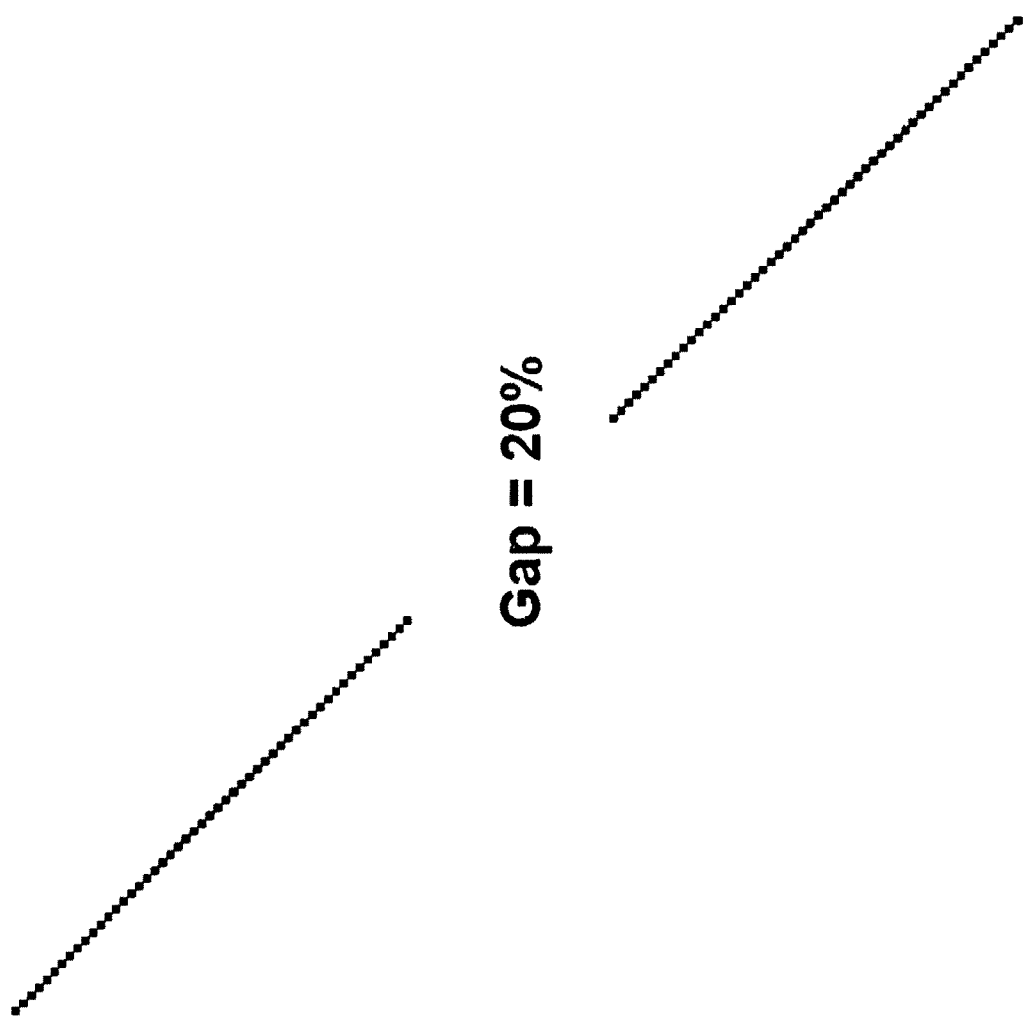
FIG. 7 is a sample image of a square with uniform intensity of 1 except along the main diagonal, provided to illustrate the processes of the disclosed embodiments.
Figure 8:
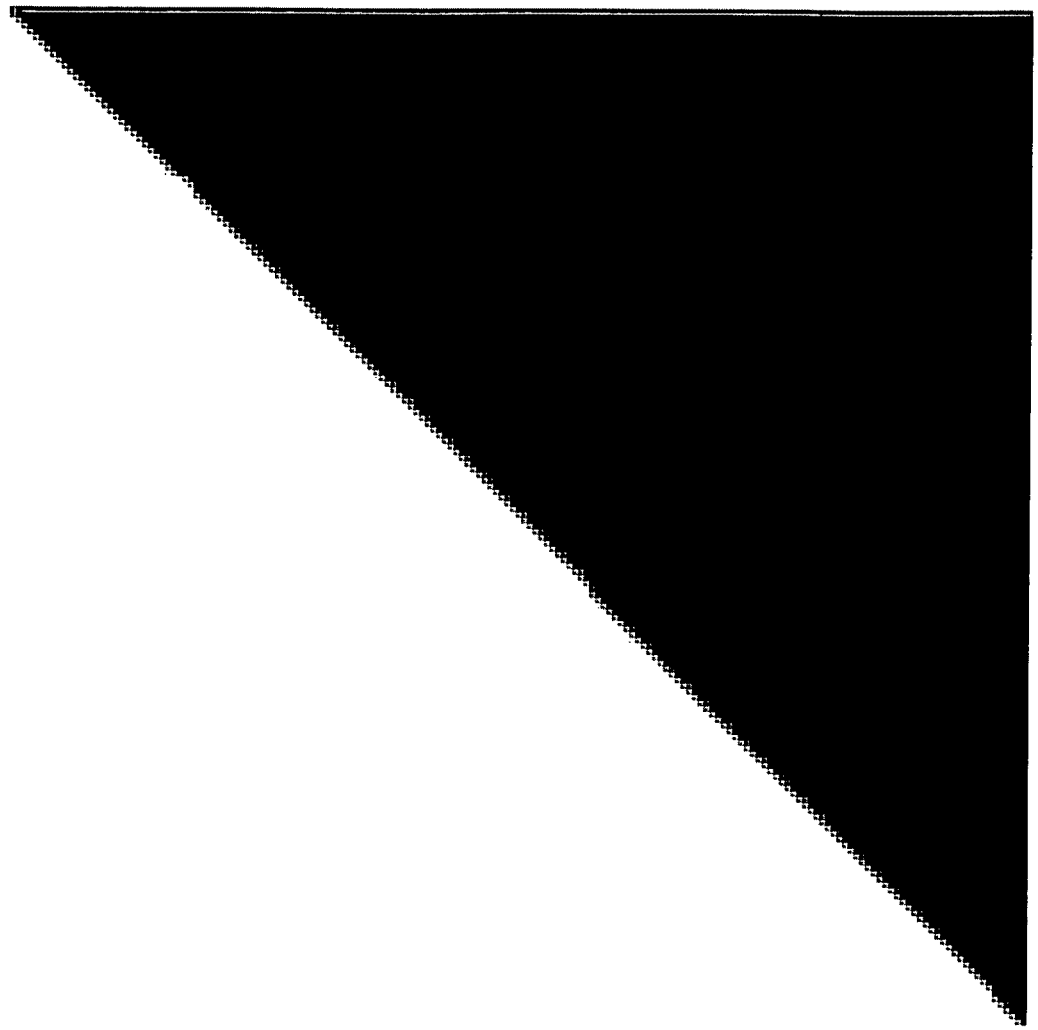
FIG. 8 illustrates the ground truth of the target mask for the image in FIG. 7.
Figure 9:
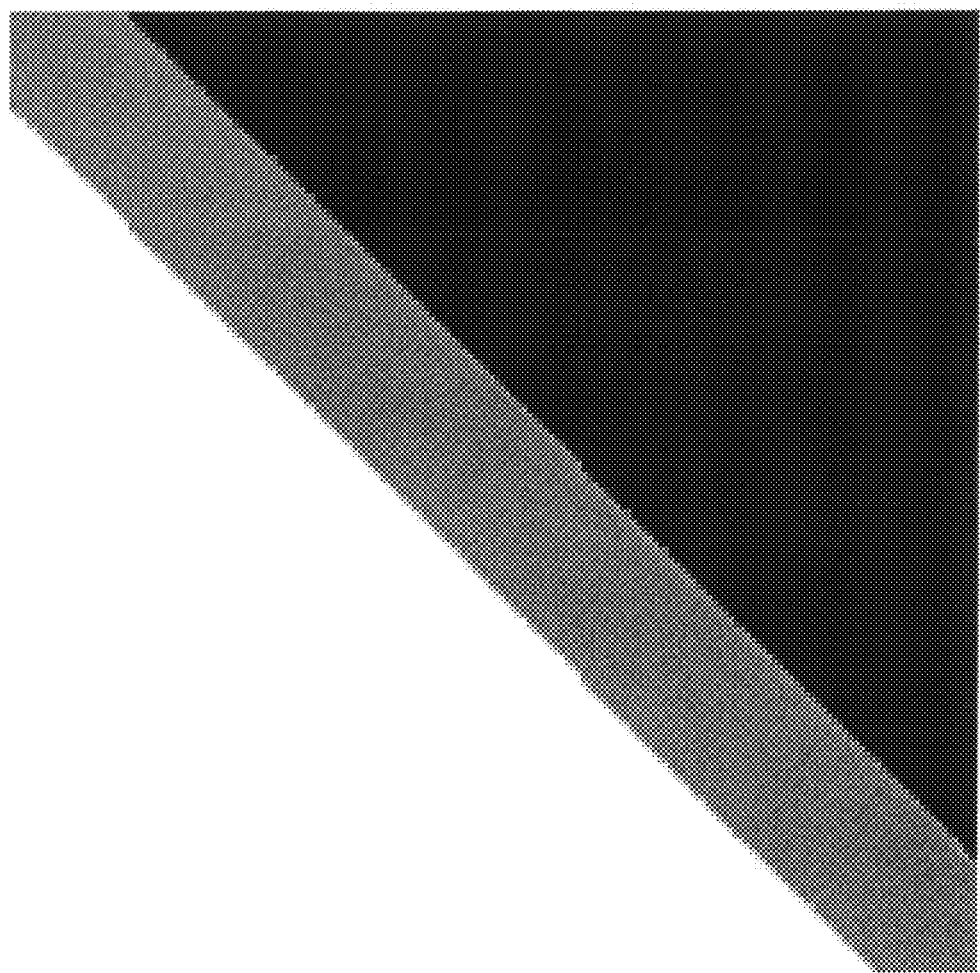
FIG. 9 illustrates a defined trimap for the image in FIG. 7. $\gamma_F=\gamma_B=10$ pixels is fixed but the gap is varied along the main diagonal.

FIG. 7 is a sample image of a square with uniform intensity of 1 except along the main diagonal, provided to illustrate the processes of the disclosed embodiments. FIG. 8 illustrates the ground truth of the target mask for the image in FIG. 7. FIG. 9 illustrates a defined trimap for the image in FIG. 7. $\gamma_F = \gamma_B = 10$ pixels is fixed but the gap is varied along the main diagonal. FIG. 7 shows the input image for 20% gap along the middle of the main diagonal. This gap represents the low contrast region which is a potential region for bleeding.

Figure 10:
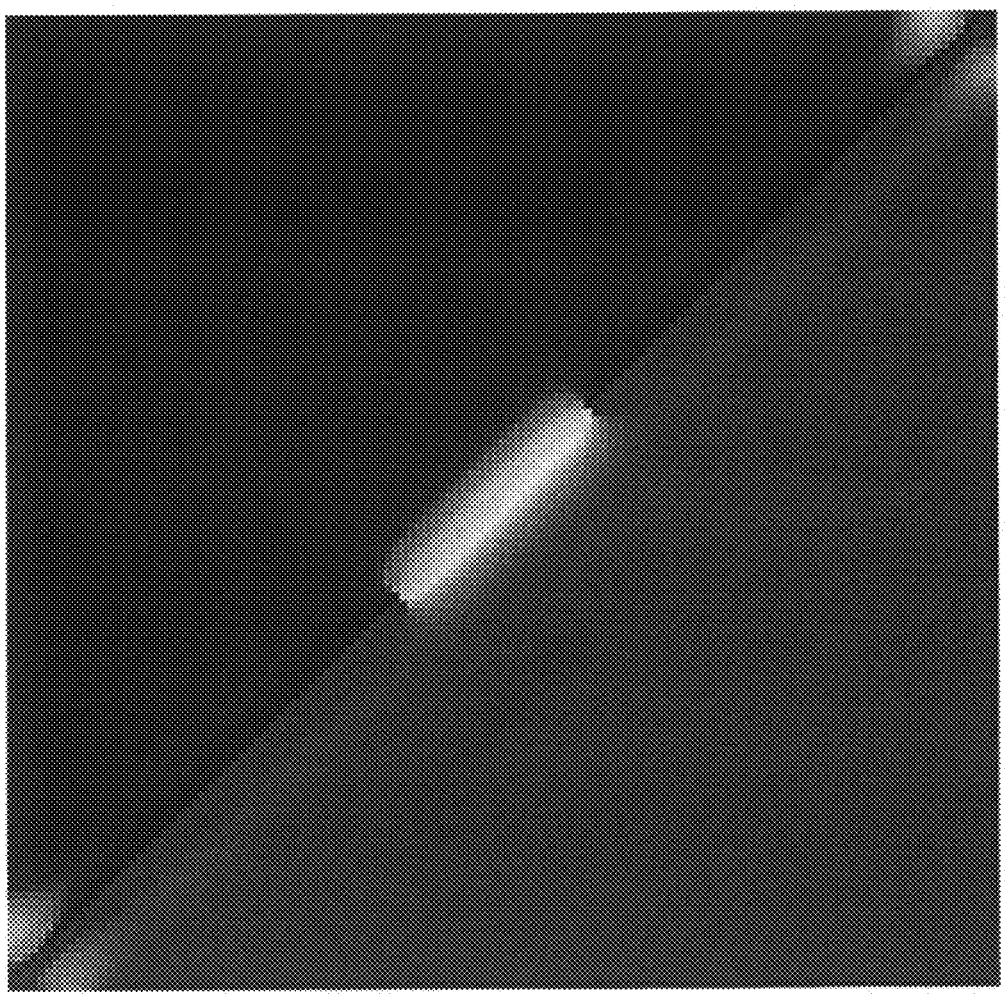
FIG. 10 displays the matting results of and Manifold Learning Matting with color and gradient features in gray scale for the image in FIG. 7 when $\gamma_F=\gamma_B=10$ pixels and gap=20%.

FIG. 10 displays the matting results of and Manifold Learning Matting with color and gradient features in gray scale for the image in FIG. 7 when $\gamma_F = \gamma_B = 10$ pixels and gap=20%. In this case, pixels cannot be accurately clustered by gradient alone, without using location of pixels or trimap. Regardless, since MLM constructs the manifold in a piecewise manner and propagates shape information to its neighboring patch manifolds, use of gradient improves the performance for MLM.

Figure 11:
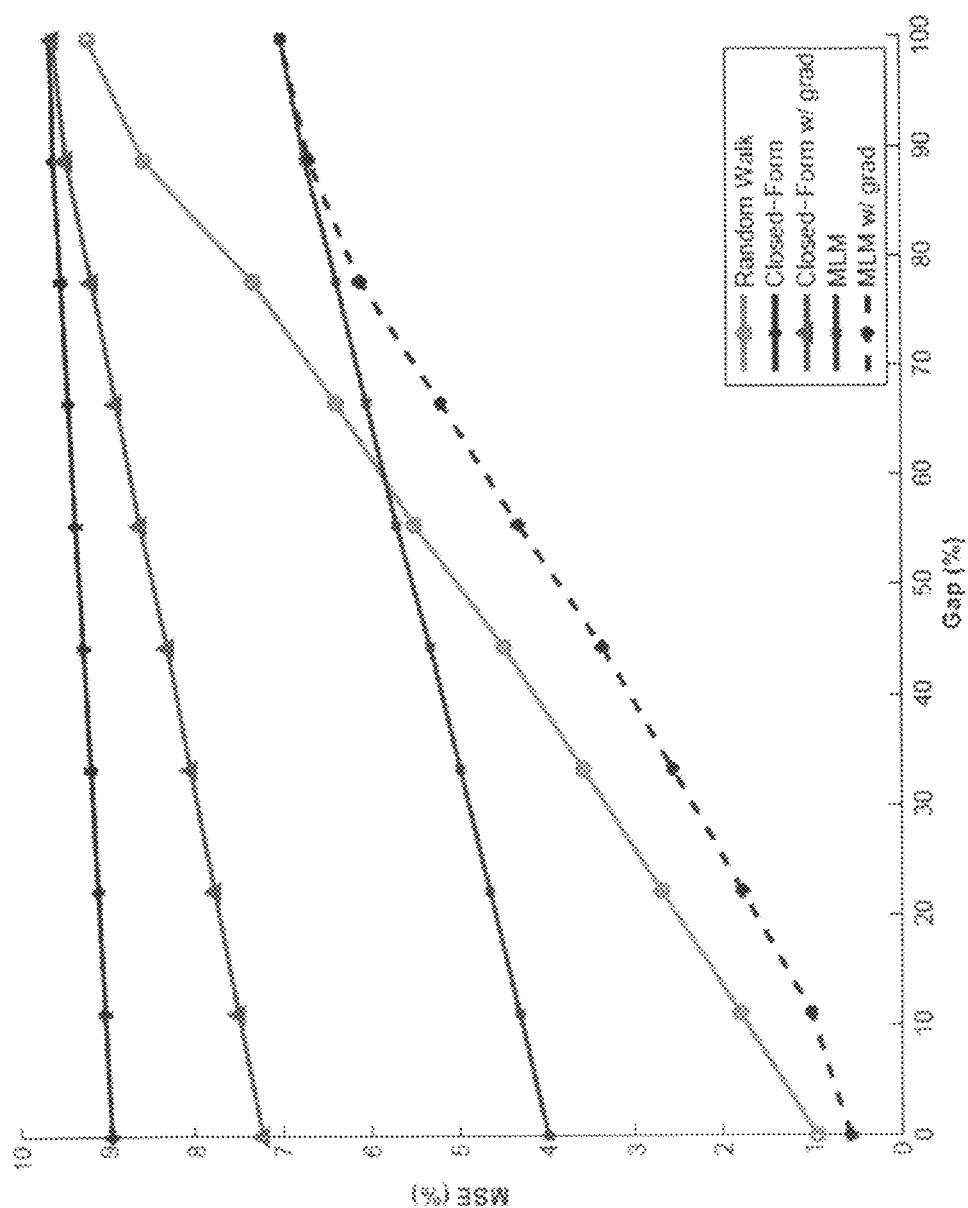
FIG. 11 is a chart utilized to illustrate the percentage of MSE when $\gamma_B=10$ pixels and the gap is varied. For larger gaps, MSE for Closed Form Matting increases even with use of gradient, unlike MLM.

To analyze the effect of gap, fix $\gamma_F = \gamma_B = 10$ pixels and vary the gap. FIG. 11 is a chart utilized to illustrate the percentage of MSE when $\gamma_B = 10$ pixels and the gap is varied. For larger gaps, MSE for Closed Form Matting increases even with use of gradient, unlike MLM.

Figure 12:
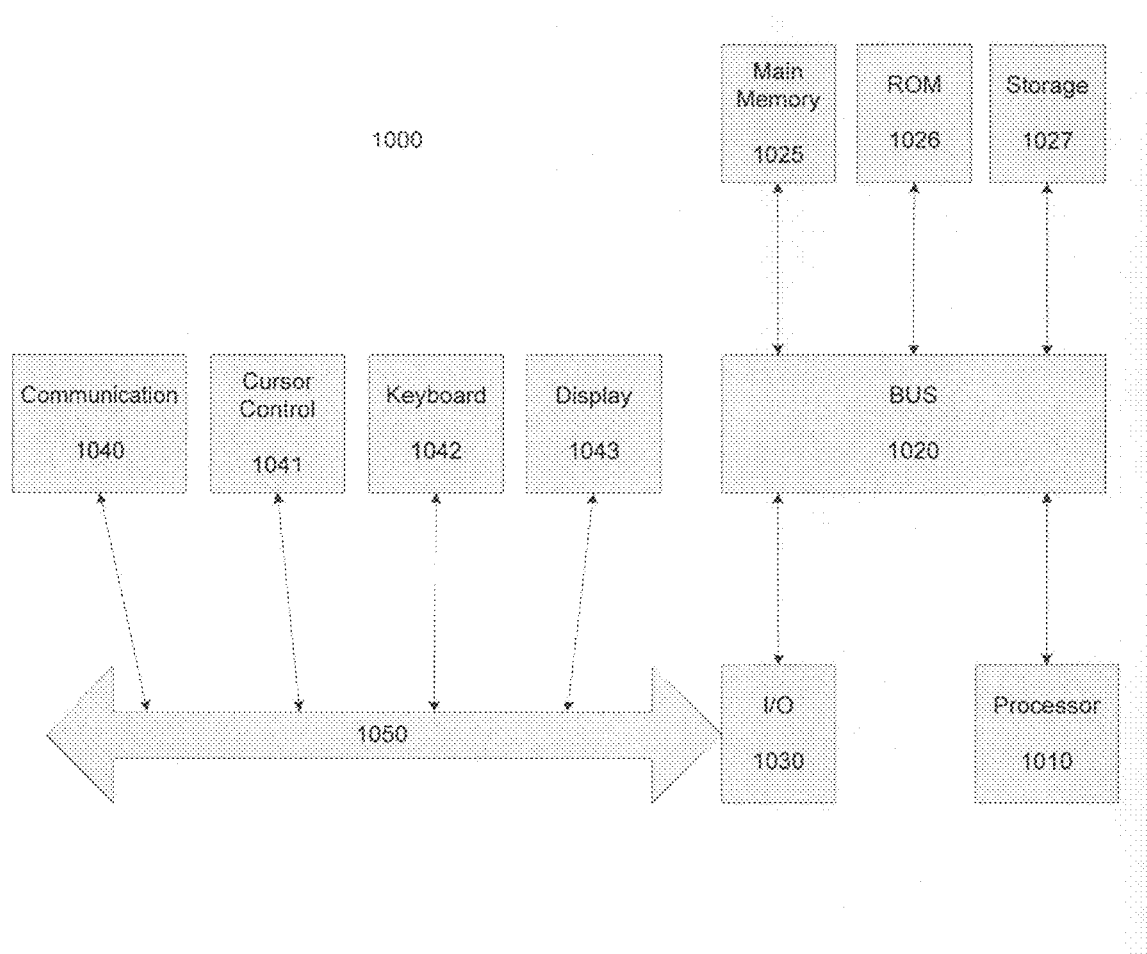
FIG. 12 illustrates an exemplary embodiment of an architecture 1000 of a computer system suitable for executing the method manifold learning for matting.

As desired, the method manifold learning for matting may be executable on a conventional general-purpose computer (or microprocessor) system. Additionally, or alternatively, the method manifold learning for matting may be stored on a conventional storage medium for subsequent execution via the general-purpose computer. FIG. 12 illustrates an exemplary embodiment of an architecture 1000 of a computer system suitable for executing the method manifold learning for matting. Computer architecture 1000 can be used to implement the computer systems or image processing systems described in various embodiments of the method manifold learning for matting. As shown in FIG. 12, the architecture 1000 comprises a system bus 1020 for communicating information, and a processor 1010 coupled to bus 1020 for processing information. Architecture 1000 further comprises a random access memory (RAM) or other dynamic storage device 1025 (referred to herein as main memory), coupled to bus 1020 for storing information and instructions to be executed by processor 1010. Main memory 1025 is used to store temporary variables or other intermediate information during execution of instructions by processor 1010. Architecture 1000 includes a read only memory (ROM) and/or other static storage device 1026 coupled to bus 1020 for storing static information and instructions used by processor 1010. Although the architecture 1000 is shown and described as having selected system elements for purposes of illustration only, it will be appreciated that the method manifold learning for matting can be executed by any conventional type of computer architecture without limitation.

A data storage device 1027, such as a conventional magnetic disk or optical disk and its corresponding drive, is coupled to computer system 1000 for storing information and instructions. The data storage device 1027, for example, can comprise the storage medium for storing the method manifold learning for matting for subsequent execution by the processor 1010. Although the data storage device 1027 is described as being magnetic disk or optical disk for purposes of illustration only, the method manifold learning for matting can be stored on any conventional type of storage media without limitation.

Architecture 1000 is coupled to a second I/O bus 1050 via an I/O interface 1030. A plurality of I/O devices may be coupled to I/O bus 1050, including a display device 1043, an input device (e.g., an alphanumeric input device 1042 and/or a cursor control device 1041).

The communication device 1040 is for accessing other computers (servers or clients) via a network. The communication device 1040 may comprise a modem, a network interface card, a wireless network interface, or other well known interface device, such as those used for coupling to Ethernet, token ring, or other types of networks.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this detailed description, but rather by the claims following.

What is claimed is:

1. A method comprising:
    receiving an image from a memory component;
    determining a feature vector associated with features of pixels in a region of the image, wherein the feature vector includes color feature information and texture feature information of the pixels;
    determining alpha values associated with opacity level of the pixels within the region, wherein the alpha values are associated with a transition from a foreground to a background of the image, and wherein the alpha values are based on color and texture; and
    forming a manifold based on the alpha values and further based on the feature vector.

2. The method of claim 1, wherein the feature vector further includes gradient of luminance information and location information of the pixels.

3. The method of claim 1, wherein determining the feature vector is based on determining features of neighboring pixels to the pixels in the region.

4. The method of claim 1 further comprising:
    forming an alpha map of feature variations at a transition from a foreground to a background associated with the image by applying a local linear embedding to the transition.

5. The method of claim 1 further comprising:
    determining a Laplacian matrix based on an alpha map of pixels associated with either the foreground or the background of the image, and wherein the Laplacian matrix is further based on an alpha map of pixels associated with the foreground and the background of the image.

6. The method of claim 1 further comprising:
    determining a Laplacian matrix based in part on the alpha values and a diagonal matrix,
    wherein the alpha values are associated with pixels of a first subregion of the image and with pixels of a second subregion of the image, wherein the first subregion is a width from a diagonal region to a region including foreground pixels and the second subregion is a width from the diagonal region to a region including background pixels, and
    wherein the diagonal matrix is a matrix of features associated with pixels at the diagonal region.

7. The method of claim 1, wherein the manifold includes pixels in the foreground of the image, pixels in the background of the image, or pixels that transition from the background to the foreground.

8. The method of claim 1 further comprising:
    forming another manifold associated with another region of the image based on shape information of the another manifold.

9. The method of claim 1 further comprising:
    forming a matte of the image based on the manifold.

10. A system comprising:
    a memory; and
    a processor configured to:
        receive an image;
        determine a feature vector associated with features of pixels in a region of the image, wherein the feature vector includes color feature information and texture feature information of the pixels;
        determine alpha values associated with opacity level of the pixels within the region, wherein the alpha values are associated with a transition from a foreground to a background of the image, and wherein the alpha values are based on color and texture; and
        form a manifold based on the alpha values and further based on the feature vector.

11. The system of claim 10, wherein the feature vector further includes gradient of luminance information and location information of the pixels.

12. The system of claim 10, wherein determining the feature vector is based on determining features of neighboring pixels to the pixels in the region.

13. The system of claim 10, wherein the processor is further configured to:
    form an alpha map of feature variations at a transition from a foreground to a background associated with the image by applying a local linear embedding to the transition.

14. The system of claim 10, wherein the processor is further configured to:
    determine a Laplacian matrix based in part on the alpha values and a diagonal matrix,
        wherein the alpha values are associated with pixels of a first subregion of the image and with pixels of a second subregion of the image, wherein the first subregion is a width from a diagonal region to a region including foreground pixels and the second subregion is a width from the diagonal region to a region including background pixels, and
        wherein the diagonal matrix is a matrix of features associated with pixels at the diagonal region.

15. The system of claim 10, wherein the processor is further configured to:
    form another manifold associated with another region of the image based on shape information of the another manifold.

16. The system of claim 10, wherein the processor is further configured to:
    form a matte of the image based on the manifold.

17. A non-transitory computer readable medium having stored thereon, computer executable instructions that, if executed by a device, causes the device to perform a method comprising:
    determining manifolds of regions in an image based on color and texture of pixels within the regions; and
    compositing the manifolds to form a matte based on a transition from a foreground to a background of the image, wherein the transition is characterized by the color and texture of pixels.

18. The method of claim 17, wherein the manifolds are regions of the image including pixels in the foreground of the image, pixels in the background of the image, and pixels that transition from the background to the foreground of the image.

19. The method of claim 17, wherein determining the manifolds are further based on a gradient of luminance of the pixels in the image.

20. The method of claim 17 further comprising:
determining each manifold based on shape information of its respective neighboring manifolds.

* * * * *